United States Patent [19]
Cords et al.

[11] Patent Number: 5,779,324
[45] Date of Patent: Jul. 14, 1998

[54] TOWED VEHICLE BRAKE SYSTEM

[75] Inventors: Frederick W. Cords, Le Sueur; David E. Frye, North Mankato; Jeffrey S. Swanson, White Bear Lake, all of Minn.

[73] Assignee: Commercial Intertech Corp., Youngstown, Ohio

[21] Appl. No.: 579,215

[22] Filed: Dec. 28, 1995

[51] Int. Cl.$^6$ ........................................ B60T 13/00
[52] U.S. Cl. ........................... 303/7; 303/15; 303/20
[58] Field of Search ........................ 303/3, 7, 8, 9.61, 303/10, 11, 15, 20, 57, 116.1, DIG. 1, 901

[56] References Cited

U.S. PATENT DOCUMENTS

| | | | |
|---|---|---|---|
| 3,948,569 | 4/1976 | Gentet et al. | 303/20 X |
| 4,054,325 | 10/1977 | Popp | 303/7 |
| 5,346,289 | 9/1994 | Cords et al. | 303/7 |
| 5,368,372 | 11/1994 | Cords et al. | 303/11 |

FOREIGN PATENT DOCUMENTS 2714723  8/1978  Germany ..................... 303/60

*Primary Examiner*—Peter M. Poon
*Attorney, Agent, or Firm*—Faegre & Benson LLP

[57] ABSTRACT

A hydraulic control system configured for use with a towed vehicle hydraulic brake system controls the pressure of the hydraulic fluid provided to the brake as a function of an operator-selected input. A hydraulic pressure control manifold is coupled between a pump and the towed vehicle brake and controls the pressure of the hydraulic fluid supplied to the brake with a plurality of pressure relief check valves interconnected in a parallel hydraulic circuit between the pump and the brake. A plurality of on-off valves are connected in a series hydraulic circuit with the check valves. The pressure relief levels of the check valves correspond to a plurality of towed vehicle braking forces. An operator of a towing vehicle chooses a desired one of the plurality of braking forces through a selector switch. When a desired braking force is chosen, appropriate on-off valves in the hydraulic pressure control manifold are closed or opened, thereby enabling or disabling appropriate check valves and controlling the pressure of the hydraulic fluid supplied to the brake and the corresponding towed vehicle braking force.

18 Claims, 4 Drawing Sheets

TOWED VEHICLE BRAKE SYSTEM

BACKGROUND OF INVENTION

1. Field of the Invention

The present invention is a hydraulic brake system for a towed vehicle. In particular, the invention is a towed vehicle brake system with an operator-selectable brake pressure control.

2. Description of the Related Art

Many towed vehicles, such as recreational and utility trailers, are equipped with hydraulic brake systems. Conventional surge brakes, for example, include a hydraulic piston which controls the flow of hydraulic fluid to the brakes in response to relative motion between the trailer and towing vehicle. Another trailer brake system is disclosed in the Cords et al. U.S. Pat. No. 5,346,289.

Towed vehicle brake systems such as those identified above generally provide a constant brake pressure regardless of the braking force required to arrest the motion of the vehicle. This can lead to braking forces which are disproportionate to the load, thereby causing the towed and towing vehicles to decelerate at uneven rates. It is evident, therefore, that there is a continuing need for improved trailer brake systems. In particular, there is a need for trailer brake systems that enable smooth towed vehicle braking at a rate which is proportional to the braking action of the towing vehicle. To be commercially viable, any such braking system must be effective and reliable.

SUMMARY OF THE INVENTION

The present invention is an improved hydraulic control system for use with a towed vehicle hydraulic brake system of the type including a hydraulic brake and a tank of hydraulic fluid for actuating the brake, and adapted to be connected to a towing vehicle having a brake and an electrical system for providing a brake signal upon actuation of the towing vehicle brake. The hydraulic control system comprises a pump configured for electrical interconnection to the towed vehicle electrical system and for hydraulic interconnection between the tank of hydraulic fluid and brake of the towed vehicle hydraulic system. The pump provides pressurized hydraulic fluid to the brake in response to the towed vehicle brake signal. The control system further includes input means for receiving an operator-selected input representative of a desired one of a plurality of towed vehicle braking forces, and fluid pressure control means coupled to the pump and input means. The fluid pressure control means controls the pressure of the hydraulic fluid provided to the brake as a function of the operator-selected input. The operator can thereby select a braking force proportional to the weight on the towed vehicle.

In one embodiment of the hydraulic control system, the fluid pressure control means includes a hydraulic pressure control manifold coupled between the pump and the brake for controlling the pressure of the hydraulic fluid provided to the brake as a function of the operator-selected input. The hydraulic pressure control manifold includes a plurality of pressure relief check valves interconnected in a parallel hydraulic circuit between the pump and the brake, and having pressure relief values corresponding to the plurality of towed vehicle braking forces. The hydraulic pressure control manifold further includes a plurality of on-off valves, each of which is connected in a series hydraulic circuit with one of the pressure relief check valves. The on-off valves are responsive to the operator-selected input and enable the operation of a pressure relief check valve corresponding to a desired towed vehicle braking force.

In another embodiment of the hydraulic control system, the fluid pressure control means includes a hydraulic pressure control manifold coupled between the pump and the brake for controlling the pressure of the hydraulic fluid provided to the brake as a function of the operator-selected input. The operator-selected input includes an operator-actuated control coupled to a mechanical linkage. The hydraulic pressure control manifold includes an adjustable pressure relief check valve interconnected between the pump and the brake. The pressure relief valve is connected to the linkage and is adjustable in response to the operator-selected input.

BRIEF DESCRIPTION OF THE DRAWINGS

FIG. 2 is a detailed schematic diagram of the hydraulic pressure control manifold shown in FIG. 1a.

DETAILED DESCRIPTION OF THE PREFERRED EMBODIMENTS

Figure 1A:
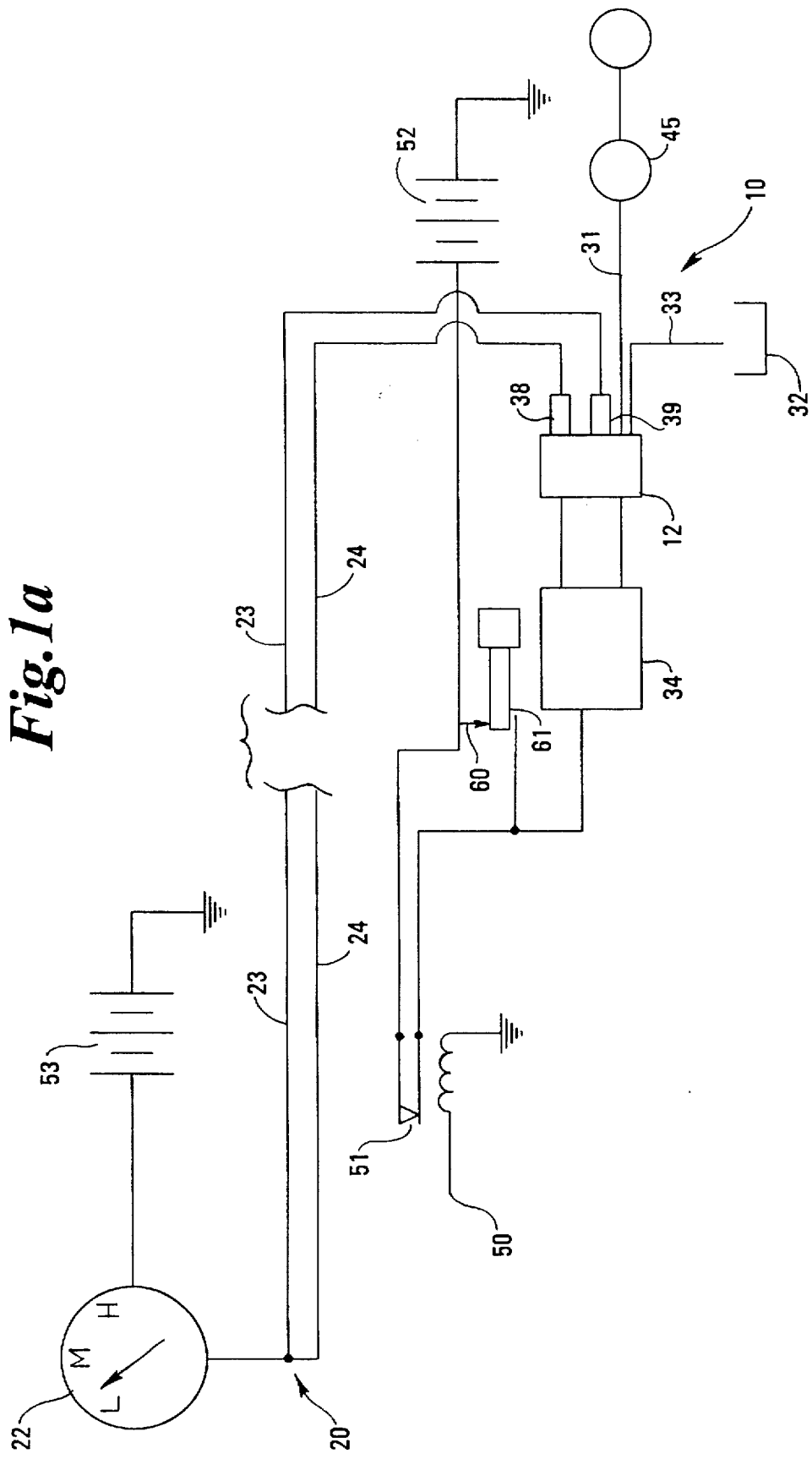
FIG. 1a is a schematic diagram of a towed vehicle brake system in accordance with the present invention, including a hydraulic pressure control manifold for controlling brake pressure in response to an electrical operator-selected input.

A towed vehicle brake system 10 including a hydraulic pressure control manifold 12 in accordance with the present invention is shown generally in FIG. 1. The pressure control manifold 12 is coupled to selection system 20 and a pump 34, and controls the flow of hydraulic fluid from a tank 32 of hydraulic fluid to a hydraulic brake 45 in response to an input from selection system 20. Brake 45 can be of any conventional or otherwise known design. Hydraulic pressure control manifold 12 is fluidly coupled to the tank 32 through hydraulic fluid line 33 and to brake 45 through hydraulic fluid line 31. Pump 34 is connected to receive hydraulic fluid from tank 32 through hydraulic pressure control manifold 12.

Figure 1B:
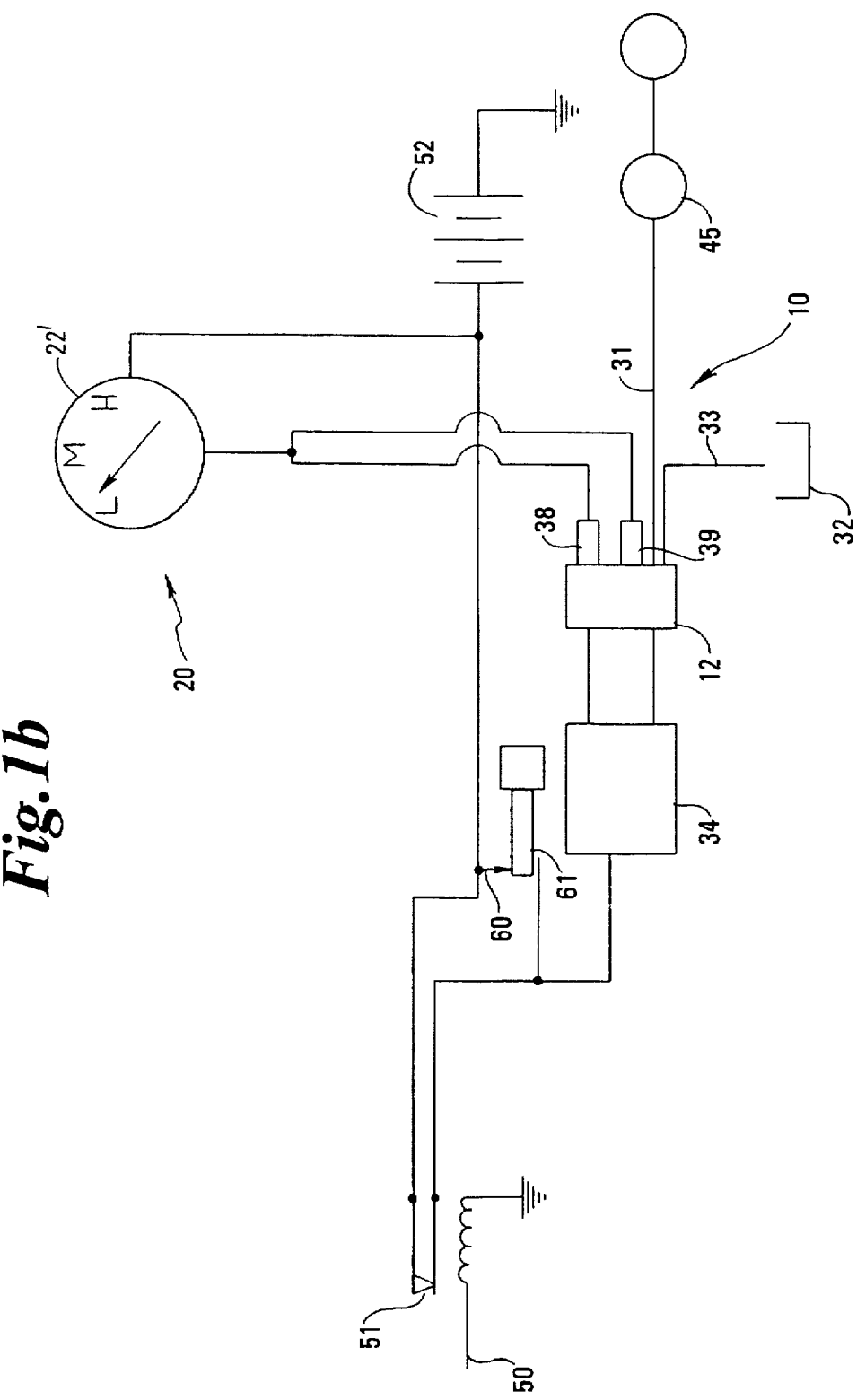
FIG. 1b is a schematic diagram of the towed vehicle brake system shown in FIG. 1a with a selection switch mounted to the towed vehicle.

An operator of a towing vehicle (not shown) chooses a desired one of a plurality of pressure levels to be supplied to brake 45 with selection system 20. In the embodiment shown, selection system 20 provides an electrical operator-selected input, and includes selector switch 22 and appropriate electrical connection wires 23 and 24. Selector switch 22 is represented in FIG. 1a as being mounted on a towing vehicle (not shown) and being electrically interconnected to a towing vehicle battery 53. In the alternative embodiment shown in FIG. 1b, a selector switch 22 is mounted to the towed vehicle and interconnected to the towed vehicle battery 52. All other features of the towed vehicle brake system 10 of FIG. 1b are identical to those shown in FIG. 1a and described herein (as shown in FIG. 1b). In the embodiment shown, the selector switch 22 has three settings, low, medium, and high, corresponding to desired low, medium, and high towed vehicle braking forces. The operator of the towing vehicle selects either the low, medium, or high setting to choose a low, medium, or high desired towed vehicle brake pressure.

Pump 34 is powered by battery 52 and is electrically connected to a towing vehicle electrical system (not shown). Pump 34 is turned on in response to brake light input 50, thereby starting the flow of hydraulic fluid from tank 32 through pressure control manifold 12 and supplying pressurized fluid to brake 45. Brake light input 50 is actuated when the operator of a towing vehicle actuates the towing vehicle brake (not shown), thereby causing the towing vehicle brake light to come on. This input signal at input 50 causes a relay 51 on the towed vehicle to close, which electrically interconnects pump 34 to battery 52 to turn pump 34 on. The towed vehicle is also equipped with a break-away switch 60 which is mechanically coupled to detection pin 61 which is mechanically coupled to the towing vehicle. In the event that the towed vehicle becomes separated from the towing vehicle, pin 61 is pulled out, causing break-away switch 60 to close. This turns pump 34 on and starts the flow of hydraulic fluid to the brake 45.

Figure 2:
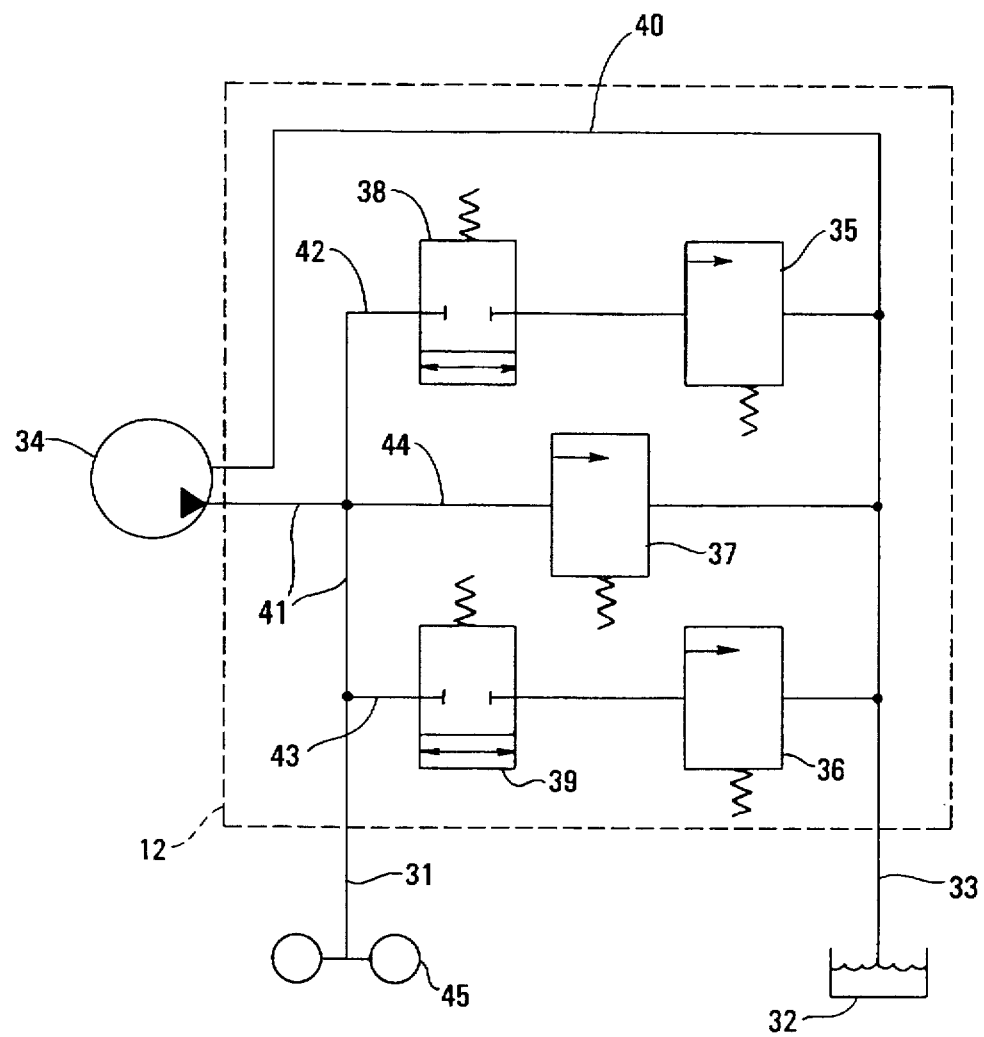

One embodiment of the hydraulic pressure control manifold 12 is shown in greater detail in FIG. 2. Pump input passage 40 in pressure control manifold 12 is connected between hydraulic fluid line 33 and pump 34 and hydraulically couples the pump 34 to the tank 32 of hydraulic fluid. Pump output passage 41 in pressure control manifold 12 is connected between the pump 34 and the brake 45. When pump 34 is turned on, hydraulic fluid flows from the tank 32 through fluid line 33, into pump input passage 40 and into pump 34. The fluid flows out of pump 34 into pump output passage 41, through line 31 and to the brake 45.

The pressure of the fluid supplied to brake 45 is controlled in response to an input from the selection system 20 through pressure relief check valves 35, 36, and 37. Check valves 35, 36, and 37 are positioned in passages 42, 43, and 44 respectively and are connected in a parallel hydraulic circuit between pump input passage 40 and pump output passage 41. Check valves 35, 36, and 37 are set to predetermined pressure relief levels, with check valve 37 set to the highest pressure level, check valve 36 set to a level lower than that of check valve 37, and check valve 35 set to a level lower than that of check valve 36. For example, typical pressure relief levels might be 100 pounds per square inch (psi) for check valve 35, 200 psi for check valve 36, and 300 psi for check valve 37. Check valves 35 and 36 are enabled and disabled in response to the input from the selector switch 22 with on-off valves 38 and 39 respectively. On-off valves 38 and 39 are positioned in passages 42 and 43 respectively and are connected in a series hydraulic circuit with check valves 35 and 36, respectively. In the embodiment shown, the on-off valves 38 and 39. The terms "open" and "closed" are used to describe the position of on-off valves 38 and 39 that corresponds to the state of the hydraulic circuits in which valves 38 and 39 are positioned (i.e. a "closed" on-off valve creates a closed hydraulic circuit though which fluid can flow while an "open" on-off valve creates an open hydraulic circuit through which fluid cannot flow). On-off valves 38 and 39 are connected to receive electrical inputs from the selection system 20 through electrical connection wires 23 and 24 respectively.

The operation of the towed vehicle brake is described as follows (for demonstration purposes, typical pressure relief values of 300 psi, 200 psi, and 100 psi are used). The operator of the towing vehicle sets selection switch 22 to the desired towed vehicle braking force—low, medium, or high. When the highest level is chosen, on-off valves 38 and 39 are switched from their normally closed positions to open positions, thereby disabling check valves 35 and 36. When pump 34 is turned on, either through relay 51 being closed in response to stop light input 51 or through break-away switch 60 being closed, hydraulic fluid flows from tank 32 into pump input passage 40 and into pump 34. Pressurized fluid then flows out of pump 34 into pump output passage 41 and into passages 42, 43, and 44. The fluid in passages 43 and 42 is restricted and does not flow to check valves 35 and 36 because on-off valves 38 and 39 are in the open position. The fluid in passage 44 flows to check valve 37, and when the pressure of the fluid is greater than 300 psi, check valve 37 is forced open and fluid flows through the valve and back into pump input passage 40. This establishes a hydraulic circuit between the pump output passage 41 and the pump input passage 40. In this manner check valve 37 limits the pressure of the fluid supplied to brake 45 through the pump output passage 41 to 300 psi. This pressure level generates the desired high towed vehicle braking force.

When the selection switch 22 is set to the medium setting, on-off valve 38 is set to the open position thereby disabling check valve 35. On-off valve 39 remains in its normally closed position, leaving check valve 36 enabled. When pump 34 is turned on, hydraulic fluid flows into and out of pump 34 as described above. Fluid flowing into passage 42 is restricted because on-off valve 38 is set to the open position. Fluid flowing into passage 43 flows through on-off valve 39 to check valve 36 and fluid in passage 44 flows to check valve 37. A hydraulic circuit between the pump output passage 41 and the pump input passage 40 is established through check valve 36 and passage 43 when the pressure of the fluid is greater than 200 psi, the pressure relief level of check valve 36. This hydraulic circuit limits the pressure of the hydraulic fluid in pressure control manifold 12 to 200 psi, and hence, check valve 37 will not be forced open since its pressure relief level is 300 psi. In this manner, the pressure of the fluid supplied to brake 45 is limited to 200 psi, and a corresponding medium braking force is generated.

When the selection switch 22 is set to the low setting, on-off valves 38 and 39 both remain in their normally closed positions and fluid flows to all three check valves, 35, 36, and 37, when the pump 34 is turned on. A hydraulic circuit is established between pump output passage 41 and pump input passage 40 through check valve 35 and passage 42 when the fluid pressure level is greater than 100 psi, the pressure relief level of check valve 35. No circuit is established in passages 43 or 44 because the pressure of the hydraulic fluid in pressure control manifold 12 is limited to 100 psi, which is less than the pressure relief levels 200 psi and 300 psi of check valves 36 and 37. In this manner, the pressure of the hydraulic fluid supplied to brake 45 is limited to 100 psi, and a corresponding low braking force is generated.

Figure 3:
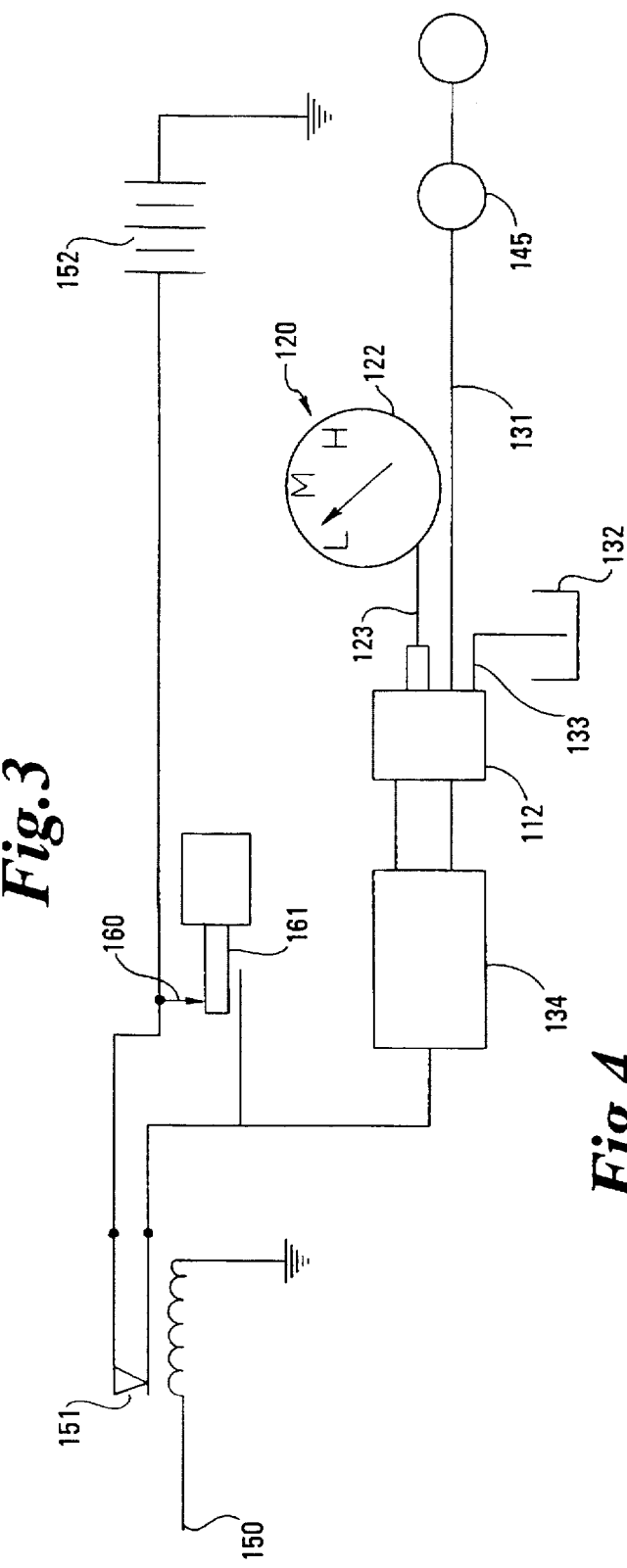
FIG. 3 is a schematic diagram of a second embodiment of a towed vehicle brake system in accordance with the present invention, including a hydraulic pressure control manifold for controlling brake pressure in response to a mechanical operator-selected input.
Figure 4:
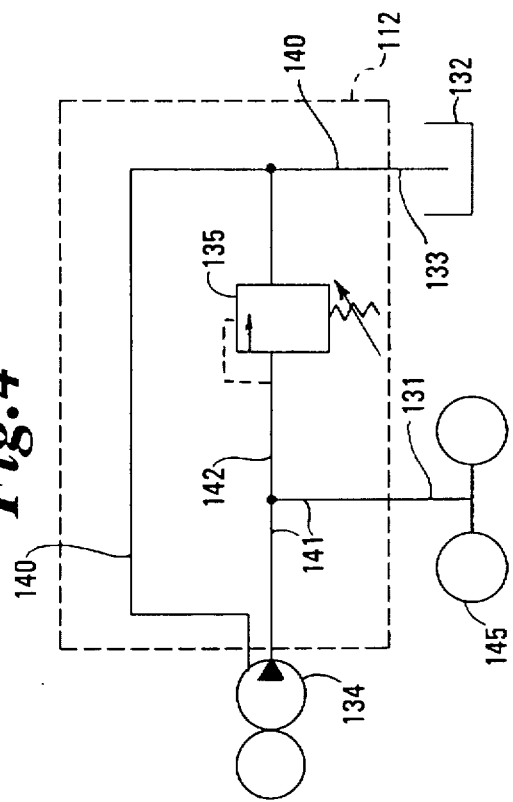
FIG. 4 is a detailed schematic diagram of the hydraulic pressure control manifold shown in FIG. 3.

A towed vehicle brake system 100 including a hydraulic pressure control manifold 112 utilizing mechanical input means is shown in FIGS. 3 and 4. Pressure control manifold 112 is coupled to selection system 120 and pump 134, and controls the flow of hydraulic fluid from a tank 132 of hydraulic fluid to a hydraulic brake 145 in response to an input from selection system 120. Pump 134 and brake 145 operate in a similar manner as described above and shown in FIGS. 1 and 2 (i.e., will be turned on when a towing vehicle brake signal is received at terminal 150 or when break-away pin 160 is released).

An operator of a towing vehicle (not shown) chooses a desired pressure level to be supplied to brake 145 with selection system 120. Selection system 120 includes selector control (a knob or handle) 122 mounted on the towed vehicle which is mechanically coupled through linkage 123 to an adjustable pressure relief check valve 135 mounted in pressure control manifold 112. As the operator varies the input from selector knob 122, the pressure relief level of check valve 135 varies proportionally. In this manner, the operator is able to control the pressure of the fluid supplied to the brake 145, and consequently control the braking force applied to the towed vehicle.

Check valve 135 is mounted in passage 142 of pressure control manifold 112 in a parallel hydraulic circuit between pump input passage 140 and pump output passage 141. When pump 134 is turned on, fluid flows from tank 132 into pump input passage 140 and into pump 134. Pressurized fluid flows from pump 134 into pump output passage 141 and into passage 142. If the pressure of the fluid is greater than the pressure relief level of check valve 135 chosen by the operator, the fluid will flow through check valve 135, thereby establishing a hydraulic circuit between pump input passage 140 and pump output passage 141. This limits the pressure of the hydraulic fluid supplied to brake 145 to a level equivalent to the pressure relief level of check valve 135. This will generate a corresponding towed vehicle braking force. In this manner, the operator can vary the pressure of the hydraulic fluid supplied to brake 145, and consequently control the braking force of towed vehicle brake system.

Although the present invention has been described with reference to preferred embodiments, those skilled in the art will recognize that changes can be made in form and detail without departing from the spirit and scope of the invention.

What is claimed is:

1. A hydraulic control system configured for use in connection with a towed vehicle hydraulic brake system including a hydraulic brake and a tank of hydraulic fluid for actuating the brake and adapted to be connected to a towing vehicle having a brake and an electrical system for providing a brake signal upon actuation of the towing vehicle brake, the hydraulic control system comprising:

a pump configured for electrical interconnection to the towing vehicle electrical system and for hydraulic interconnection between the tank of hydraulic fluid and brake of the towed vehicle hydraulic system, for providing pressurized hydraulic fluid to the brake in response to the towing vehicle brake signal;

input means for receiving an operator-selected input representative of a desired one of a plurality of constant-level towed vehicle braking forces; and fluid pressure control means coupled to the pump and input means, for controlling the pressure of the hydraulic fluid provided to the brake as a function of the operator-selected input, and causing the application of the desired constant-level towed vehicle braking force represented by the operator-selected input.

2. The hydraulic control system of claim 1 wherein the fluid pressure control means includes a hydraulic pressure control manifold coupled between the pump and the brake for controlling the pressure of the hydraulic fluid provided to the brake as a function of the operator-selected input.

3. The hydraulic control system of claim 2 wherein the hydraulic pressure control manifold includes:

a plurality of pressure relief check valves interconnected in a parallel hydraulic circuit between the pump and brake, and having pressure relief values corresponding to the plurality of constant-level towed vehicle braking forces; and a plurality of on-off valves, each connected in a series hydraulic circuit with a different one of the plurality of pressure relief check valves and responsive to the operator-selected input, for enabling the operation of a pressure relief check valve corresponding to the desired constant-level towed vehicle braking force as a function of the operator-selected input.

4. The hydraulic control system of claim 3 wherein:

the operator-selected input is an electrical signal representative of the desired towed vehicle braking force; and the on-off valves are solenoid valves responsive to the electrical signal.

5. The hydraulic control system of claim 4 and further including an operator-actuated switch for generating the electrical signal representative of the desired towed vehicle braking force.

6. The hydraulic control system of claim 5 wherein the operator-actuated switch is mounted on the towing vehicle.

7. The hydraulic control system of claim 5 wherein the operator-actuated switch is mounted on the towed vehicle.

8. The hydraulic control system of claim 4 wherein all but one of the plurality of pressure relief check valves are connected in a series hydraulic circuit with a different one of the plurality of on-off valves.

9. The hydraulic control system of claim 8 wherein:

the operator-actuated switch comprises at least three settings, including:

a first setting corresponding to a first desired towed vehicle braking force;

a second setting corresponding to a second desired towed vehicle braking force which is greater than the first; and a third setting corresponding to a third desired towed vehicle braking force which is greater than the second; and the hydraulic pressure control manifold includes:

at least three pressure relief check valves wherein: the first check valve is set to a first pressure relief level;

the second check valve is set to a second pressure relief level which is greater than the first; and the third check valve is set to a third pressure relief level which is greater than the second; and at least two on-off valves wherein:

the first on-off valve is in a series hydraulic circuit with the first check valve and is responsive to the first setting of the operator-actuated switch; and the second on-off valve is in a series hydraulic circuit with the second check valve and is responsive to the second setting of the operator-actuated switch.

10. The hydraulic control system of claim 2 wherein:

the operator-selected input includes:

an operator-actuated control; and a mechanical linkage coupled to the operator-actuated control; and the hydraulic pressure control manifold includes a pressure relief check valve interconnected between the pump and brake and connected to the linkage, and having a pressure relief value that is adjustable in response to the operator-selected input.

11. A trailer including the hydraulic control system of claim 10.

12. A hydraulic control system configured for use in connection with a towed vehicle hydraulic brake system including a hydraulic brake and a tank of hydraulic fluid for actuating the brake and adapted to be connected to a towing vehicle having a brake and an electrical system for providing a brake signal upon actuation of the towing vehicle brake, the hydraulic control system comprising:

a pump configured for electrical interconnection to the towing vehicle electrical system and for hydraulic interconnection between the tank of hydraulic fluid and brake of the towed vehicle hydraulic system, for providing pressurized hydraulic fluid to the brake in response to the towing vehicle brake signal;

an operator-actuated switch for generating an operator-selected input representative of a desired one of a plurality of constant-level towed vehicle braking forces; and a hydraulic pressure control manifold coupled between the pump and the brake for controlling the pressure of the hydraulic fluid provided to the brake as a function of the operator-selected input, and causing the application of the desired constant-level towed vehicle braking force represented by the operator-selected input.

13. The hydraulic control system of claim 12 wherein the hydraulic pressure control manifold includes:

a plurality of pressure relief check valves interconnected in a parallel hydraulic circuit between the pump and brake, and having pressure relief values corresponding to the plurality of towed vehicle braking forces; and a plurality of on-off valves, each connected in a series hydraulic circuit with one of the pressure relief check valves and responsive to the operator-selected input, for enabling the operation of a pressure relief check valve corresponding to a desired towed vehicle braking force as a function of the operator-selected input.

14. The hydraulic control system of claim 13 wherein:

the operator-selected input is an electrical signal representative of the desired towed vehicle braking force; and the on-off valves are solenoid valves responsive to the electrical signal.

15. A trailer including the hydraulic control system of claim 14.

16. The hydraulic control system of claim 12 wherein:

the operator-actuated switch is a control knob; and the operator-selected input includes a mechanical linkage coupled to the operator-actuated switch.

17. The hydraulic control system of claim 16 wherein the hydraulic pressure control manifold includes a pressure relief check valve interconnected between the pump and brake, and having a pressure relief value that is adjustable in response to the operator-selected input.

18. A trailer including the hydraulic control system of claim 17.

* * * * *